Oct. 17, 1944. W. G. CALDER 2,360,314
PIPE JOINT AND SEAL-DAM THEREFOR
Filed Feb. 27, 1943
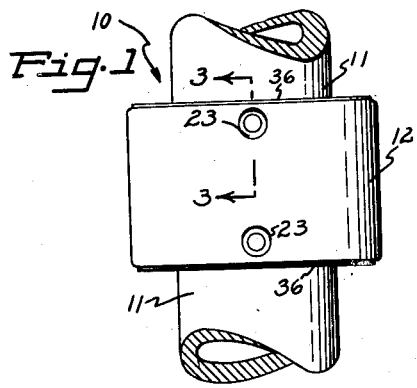
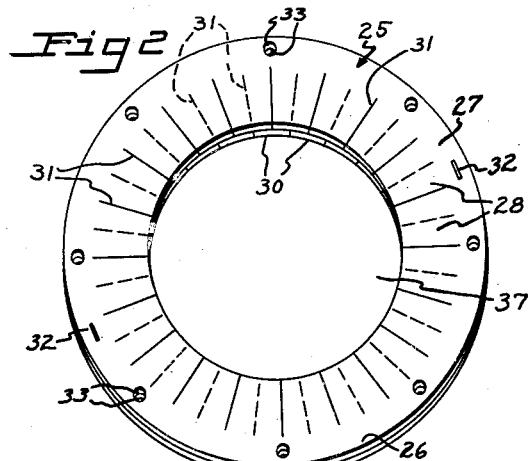
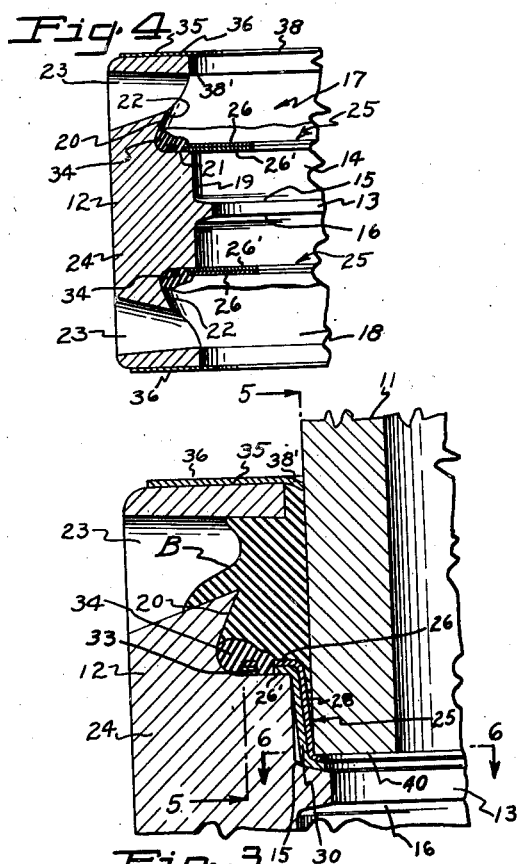
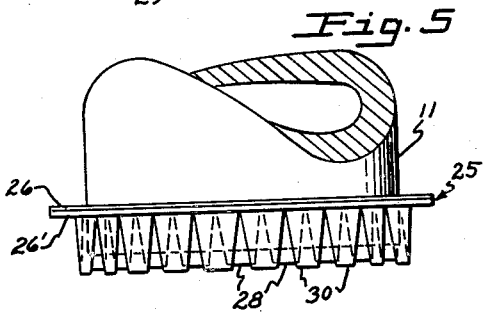
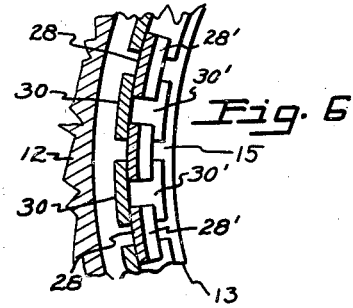
Inventor
William G. Calder
By Barthelow & Scantlebury
Attys.

Patented Oct. 17, 1944

2,360,314

UNITED STATES PATENT OFFICE 2,360,314

PIPE JOINT AND SEAL-DAM THEREFOR

William G. Calder, Los Angeles, Calif.

Application February 27, 1943, Serial No. 477,424

16 Claims. (Cl. 285—163)

This invention relates generally to pipe joints and seal-dams therefor, and, since it is particularly well suited for use in connection with ceramic pipes, such as conduit and sewer lines, I have illustrated and will describe the invention as put to this use, but this choice for illustrative and descriptive purposes is not to be considered as limitative on the invention.

Joints of this nature may be generally characterized as of the bell and spigot type. I have shown the invention in connection with a form of bell and spigot joint wherein the bell, instead of being integral with one end of a pipe section, is in the form of a separate collar into the opposite ends of which are fitted the plain ends of pipe sections. This form of joint is acknowledged to be superior, from many different standpoints, to the integral-bell form and it is for this reason I have chosen it for illustrative purposes, but it will be understood that the invention extends to and is of advantage in connection with all forms of bell and spigot joints.

The difficulties of providing a properly sealed joint for ceramic sewer pipe are well understood, it not only being necessary to provide a rigid joint which may be made up very quickly and comparatively cheaply, but one which will resist the entry of root growths from the exterior as well as the leakage of sewage from the interior. It is also essential that the sealing operation does not result in the formation of protuberances in the pipe bore, for internal protuberances catch sewage matter and thus initiate pipe-clogging.

It is therefore the principal object of the present invention to provide a readily fabricated and rigid joint and a seal-dam making that joint possible, the joint being of a nature to prevent both outward leakage and inward root-entry, the operation of forming the joint being such as to eliminate the danger of forming internal protuberances made up of the sealing material.

There has been developed a joint of the collar type wherein the internal diameter of the collar is sufficiently greater than the external diameter of the pipe to provide an annular space of appreciable width between the collar and the pipe section, the end of the pipe section bottoming or shouldering on an internal flange within the collar. A rubber annulus is applied to a transverse shoulder formed by grooving the bore wall, the annulus projecting radially into the collar bore a sufficient extent to underlie the pipe section as it is being thrust into the collar. This means, of course, that the diameter of the annulus bore is less than the outside diameter of the pipe section. However, as the pipe section enters the collar the rubber stretches sufficiently to allow the entry of the pipe section through the annulus bore, the rubber being drawn down towards the shouldering flange somewhat in the form of a cone. Sealing material is then introduced to the space between the collar and the pipe section, the rubber annulus forming a dam to limit the flow of sealing material and restraining that material until it has hardened.

The current shortage of rubber has resulted in the prohibition of such rubber dams. The present invention makes possible the use of material which is still available, and, at the same time, it both reduces the cost of the joint and gives better results than when rubber was used.

How this is accomplished, as well as other objects and features of the invention, will be made apparent in the following detailed specification, but it is desired to make the point now that while the primary purpose of the improved seal-dam is to form a stop for limiting the flow of sealing material, it also has sealing function, per se, and the fact that throughout the description and in the claims this element is called a seal-dam, is not to be taken as indicating it may not have functions other than that of a dam nor as limiting the broader claims to its use as a dam. Thus, such of the claims as do not call for other sealing means, are to be considered as extending to situations where this element may have the primary function of a seal or gasket.

Reference will be had to the accompanying drawing, in which:

Fig. 1 is an elevation of a pipe joint embodying my invention;

Fig. 2 is a detached, perspective view of my improved seal-dam as it appears prior to installation in a joint;

Fig. 3 is a fragmentary view, on an enlarged scale, as taken on line 3—3 of Fig. 1;

Fig. 4 is a fragmentary section through a pipe collar to which the seal-dam has been applied, showing the association of parts prior to the introduction of the pipe section and the main seal;

Fig. 5 is a schematic elevation in which the pipe end and seal-dam are shown apart from the collar and as though they were viewed from the position of line 5—5 in Fig. 3, except that the fingers of the dam are not shown as bent under the end of the pipe section; and Fig. 6 is an enlarged fragmentary section taken on line 6—6 of Fig. 3.

For illustrative purposes I have shown a joint 10 in which the ends of ceramic pipe sections 11 are connected by ceramic coupling or collar 12. This collar may be considered as the bell or socket member of the joint.

Collar 12 has a medial, annular, internal flange 13 which projects into collar bore 14 and presents transverse annular shoulders 15 and 16 facing towards opposite ends of the collar. Rib 13 divides bore 14 into sockets 17 and 18, but since these sockets are similar and since the elements entered therein are similar, I will describe only one socket and its contained elements.

The bore wall 19 of socket 17 is annularly grooved at 20 to provide an annular transverse shoulder 21 which faces toward the upper end of the collar and which is offset with relation to the bore 14. Though this is not essential, the groove-defining wall 22 may incline, as clearly shown in Fig. 4, to give conical characteristics to the groove. A seal-pouring passageway 23, through wall 24 of the collar, opens to groove 20.

The seal-dam or "gasket" generally indicated at 25 is made up of a multiple-ply annulus. The number of plies, over two, may be varied in accordance with the sealing problem presented, but I have here shown only two such plies since that number suffices in most situations.

Ply 26 is made up of an annular body portion 27 and inwardly extending fingers 28, while ply 26' is made up of annular body portion 29 and inwardly extending fingers 30. In each case, the fingers are formed by radially slitting the ply at 31, the slits starting from the inner peripheral edges of the annuli but stopping short of the outer peripheral edges thereof, though this method of forming the fingers is not limitative on the invention since it will be apparent from the following that the edges of adjacent fingers in a given ply do not have to engage one another.

The two plies 26 and 26' are placed in face to face engagement but are so relatively arranged that the slits 31 of one ply are angularly staggered with respect to the slits of the other ply, it following that fingers 28 are angularly staggered with respect to fingers 30. Since the dams are normally fabricated independently of the collars and are usually applied to the collars at a relatively remote assembly point, it is desirable, though not essential, that the plies be fastened permanently together with their fingers properly staggered and with one ply accurately overlying the other, before they are transmitted to the assembly point. For this purpose I have provided wire staples 32 which connect the body portions of the two annuli against relative displacement, though the fingers of one ply are still capable of movement with relation to the fingers of the other ply, that is, the fingers, while maintained in face-to-face engagement, may be bent out of the planes of their respective body portions with the fingers of one ply sliding with relation to the fingers of the other ply. Staples 32 also hold the plies in such relative positions that the apertures 33, which pierce the body portions of the plies, are held in register—the purpose of these apertures being explained at a later point.

While it lies within the broader aspects of my invention to form the plies of any suitable flexible material, I have found that certain types of paper are used with particular advantage, and I will therefore describe the plies as so made up, with the understanding that these specifications are not limitative on my broader claims.

I have found it of advantage to use one type of paper for one of the plies and another type of paper for the other ply, and I will now set forth the preferred choice, though the reasons therefor will be pointed out to better advantage at a later point in the description. Thus, for example, I prefer to make the upper ply 26 of a relatively hard, thin and tough fibrous paper which is capable of taking waterproofing. I have found that 40 lb. "brownskin" has the proper characteristics for joints of about 4" diameter, though it is preferable that in joints of appreciably larger diameter, paper of greater weight, but otherwise having the same characteristics, be substituted.

On the other hand, lower ply 26' is preferably relatively soft, thick and pliable so it may conform readily and snugly to the faces which it is ultimately to oppose, and so it may act properly as a filler. A suitable paper for this purpose is known as "felt" paper which is made up quite largely of an asphalt impregnated cloth base. For a 4" joint, a 15 lb. felt paper gives good results, though in larger joints it is preferable to use felt paper of greater weight.

As will later appear, dam 25 is applied, in flat form, to shoulder 21 of collar 12, fingers 28 and 30 projecting radially into socket 17. In this form, the assemblies made up of collars and dams are shipped to the field and are stacked pending their final assembly with the pipe sections. Consequently, the dams are often exposed to the weather, sometimes for relatively long periods of time, and it is therefore preferable that they, or at least the upper ply 26, be treated with waterproofing material during their fabrication. I have found that a mixture of red oxide, rubber cement and a solvent, applied to the upper face of the top ply, forms an effective waterproof. This material runs into the slits of the upper ply and some of it usually finds its way to the lower ply, either through the slits or at the inner ends of the fingers. It renders the fingers sticky, acting as a non-setting adhesive either or both to yieldingly hold the upper fingers together or to hold them to the lower fingers, though adherence is not sufficiently strong to resist relative movement between the fingers of the two plies during later insertion of the pipe sections. The fingers of the upper ply are thus kept from curling upwardly prior to the introduction of the pipe sections—an obvious advantage.

Dam 25 is assembled with collar 12 in the manner shown in Fig. 4, the body portion 29 of ply 26' resting on shoulder 21, and the fingers of both plies extending radially into bore 14. Means are provided for holding the dam against accidental displacement from shoulder 21 prior to the completion of the joint, and for holding the body portions of the plies from being dragged off shoulder 21 during the insertion of the pipe section. This means comprises the introduction of an annular fillet of sealing material or cement which is poured in liquid form into the lower corner of groove 20 and over the body portion of the upper ply, the cement also flowing through apertures 33 to form key bonds with the underlying portions of shoulder 21. The cement or sealing fillet is indicated at 34 in Fig. 4 and may be made up of such material as Tegal Ampco, which is composed of synthetic rubber, sulphur and silica. This cement is poured in as hot, thin fluid, and when it cools and dries it forms a very hard mass which is intimately bonded with the ceramic material of the collar and with the dam 25.

I preferably cement to the upper end 35 of collar wall 24, an annular seal-dam 36 which may be made of the same material as upper ply 26, though this dam is not necessarily slit to form fingers.

The collars, complete with both internal and external seal-dams 25 and 36, respectively, are shipped to the field and are applied to the pipe as it is laid. The outside diameter of pipe section 11 is appreciably less than the diameter of bore 14 and appreciably greater than the diameter of dam-bore 37 when dam 25 is in the flat condition of Figs. 2 and 4. On the other hand, the outside diameter of pipe 11 is only slightly greater than the diameter of bore 38 of external dam 36. Thus, pipe section 11 is annularly spaced from bore wall 19 both above and below groove 20, while flange 13 projects sufficiently into bore 14 to form a stop limiting the extent to which the pipe section may be entered in the collar.

As pipe section 11 is thrust into socket 17, it bends downwardly the projecting portion 38' of dam 36, as shown in Fig. 3, the paper of which the dam is made being capable of stretching, without rupture, sufficiently to allow such entry of the pipe section, it being remembered that the pipe section is only slightly larger than the dam bore. The inner peripheral edge of the dam tightly embraces the pipe section.

As the lower end 40 of the pipe section strikes the projecting fingers of the internal dam 25, these fingers are bent downwardly, the ends of fingers 28 tightly engaging the pipe. The lower ends of all fingers are finally turned horizontally and clamped between shoulder 15 and the pipe end 40.

As the pipe is descending to this position and the fingers are thus being bent downwardly, the distal ends of those fingers become spread apart to accommodate the pipe. However, due to the staggering of slits 31 and fingers 28—30, each finger of a given ply spans the opening between two adjacent fingers of the other ply or, in other words, each finger of a given ply overlaps portions of two adjacent fingers of the other ply, as schematically represented in Fig. 5. This gives the effect of a fully closed or solid conical dam. The same effect of overlap between ply fingers and the bridging of the slits in one ply by fingers of the other ply, also exists in that portion of the dam which is clamped between shoulder 15 and pipe-end 40, as is shown in Fig. 6 wherein the bent-under and clamped ends of fingers 28 and 30 are indicated at 28' and 30', respectively. Thus the over-lapping of finger ends 28' and 30' give the effect of a solid annulus.

The reason for the differential characteristics of the ply material now becomes apparent. The relatively soft, thick and pliable nature of ply 26', particularly when it is impregnated with asphalt, allows this ply to conform readily and snugly to the collar surfaces which it engages. On the other hand, the tough, hard paper of the upper ply, which would not so nicely conform to and fit the collar surfaces, is well adapted to take the abuse and wear incidental to the forcing of the pipe section to seated position—a type of stress which the softer paper of the lower ply could not well withstand. It being remembered that the body portions of the plies are cemented to shoulder 15, it will be realized the tendency of the descending pipe to drag the dam from the shoulder sets up rupturing stresses which can be properly resisted only by fashioning the upper ply of relatively tough paper. By making the upper ply of relatively hard paper, it is better adapted to resist the abrasive effect of the descending pipe.

It will be seen that the dam, in the condition of Fig. 3, bridges the annular space between shoulder 15 and pipe section 11, the overlapping of the fingers making this bridge or closure complete. On the other hand, the annular space between pipe section 11 and the upper end of collar 12, is closed by portion 38' of external dam 36. With the joint in this condition, a body B of sealing cement is poured through passageway 23 into groove 20, preferably filling the groove completely and completely filling the annular space between section 11 and collar 12 from internal dam 25 to external dam 36. The sealing material B may be of any suitable leak-proof cement which will properly bond with the pipe section and collar. As an example, this sealing material may be the same as that used for forming fillet 34, namely, Tegal Ampco. As in the case of fillet 34, this cement, poured in hot, fluid form, dries and cools into a hard, solid mass which is intimately bonded with the ceramic pipe section and collar, and forms a leak-proof joint therebetween. The cement B will also, of course, bond with fillet 34.

Cements of the character named are very thin when heated to a pouring condition, and were dam 25 not to form a complete seal, the cement would run out into the bore of the collar and even into the bore of the pipe where, when it ultimately hardened and set, it would form an obstruction to catch solid matter in the stream flowing through the completed pipe and thus create danger of clogging the pipe. Further, if the cement were to leak at the bottom of the joint, it would be difficult to insure a complete filling of groove 20, and this would result in an imperfect seal.

However, a dam fashioned in the manner described, prevents such leakage of the cement, thus preventing the formation of internal obstructions within the pipe, and insuring a complete filling of groove 20. As a matter of fact, the paper of which the dam is made has a tendency to cause the cement to coagulate upon it, and the cement first contacting the dam and coagulating thereupon forms an initial barrier which tends to prevent further passage of the hot sealing material. It is, of course, the body B of sealing material above the dam which forms the major seal between the pipe and collar and which is depended upon for holding the collar and pipe section against relative movement.

It will be recognized that with the pipe section and collar held against relative movement by means other than that here indicated, dam 25, clamped in the position shown in Fig. 3, will, in itself, become a sealing member or gasket, and, even in the environment in which it is shown in Fig. 3, said dam also may be considered as having some packing or sealing function. Accordingly, the fact that this element 25 is called a "dam" in the claims is not to be considered as indicating that it depends wholly for its novelty upon its combination with other sealing means.

While I have shown and described a preferred embodiment of my invention, various changes in design, structure and arrangement may be made without departing from the spirit and scope of the appended claims.

I claim:

1. A seal-dam for pipe joints, embodying a multiple-ply annulus of flexible material, each ply having slits extending from its inner peripheral edge towards but stopping short of its outer peripheral edge, the slits of the plies being relatively staggered, and the material between the slits of one ply being movable with relation to the material between the slits of the adjacent ply.

2. A seal-dam for pipe joints, embodying a multiple-ply annulus, one ply being of relatively soft pliable fibrous material, and another ply being of relatively hard and tough pliable material, each ply having slits extending from its inner peripheral edge towards but stopping short of its outer peripheral edge, the slits of the plies being relatively staggered, and the material between the slits of one ply being movable with relation to the material between the slits of the adjacent ply.

3. A seal-dam for pipe joints, embodying a multiple-ply annulus, each ply embodying an anular body portion and a plurality of fingers extending inwardly from the body portion, said fingers being of flexible material and the fingers of one ply being movable with respect to the fingers of another ply, and the fingers of one ply each overlapping portions of two adjacent fingers of the adjacent ply.

4. A seal-dam for pipe joints, embodying a multiple-ply annulus, each ply embodying an annular body portion and a plurality of fingers extending inwardly from the body portion, means securing the body portions of the plies against relative bodily movement, said fingers being of flexible material and the fingers of one ply being movable with respect to the fingers of another ply, and the fingers of one ply each overlapping portions of two adjacent fingers of the adjacent ply.

5. A seal-dam for pipe joints, embodying a multiple-ply annulus, each ply embodying an annular body portion and a plurality of fingers extending inwardly from the body portion, said fingers being of flexible material and the fingers of one ply being movable with respect to the fingers of another ply, a non-setting adhesive between the fingers of adjacent plies adapted yieldingly to resist such movement, and the fingers of one ply each overlapping portions of two adjacent fingers of the adjacent ply.

6. A seal-dam for pipe joints, embodying a multiple-ply annulus, each ply embodying an annular body portion and a plurality of fingers extending inwardly from the body portion, the fingers of one ply being of relatively soft pliable fibrous material, and the fingers of another ply being of relatively hard, and tough pliable material, and the fingers of one ply each overlapping portions of two adjacent fingers of the other ply.

7. A seal-dam for pipe joints, embodying a multiple-ply annulus, each ply embodying an annular body portion and a plurality of fingers extending inwardly from the body portion, the fingers of one ply being of felt paper, and the fingers of another ply being of hard paper, and the fingers of one ply each overlapping portions of two adjacent fingers of the other ply.

8. A seal-dam for pipe joints, embodying a multiple-ply annulus, each ply embodying an annular body portion and a plurality of fingers extending inwardly from the body portion, the fingers of one ply being of relatively thick felt paper, and the fingers of another ply being of relatively thin and hard paper, and the fingers of one ply each overlapping portions of two adjacent fingers of the other ply.

9. In a pipe joint, an annular socket member, a pipe section inserted in the bore of the socket member, the outer peripheral face of the pipe section being spaced from the bore wall of the socket, a first transverse shoulder spaced from one end of the socket member and extending radially into the socket bore and into opposition with the inner end of the pipe section, a second transverse shoulder in the socket member bore but extending radially outward from said bore and said at a point between said first shoulder and said one end of the socket member, a seal-dam comprising an annulus embodying an outer portion and an inner portion, the outer portion being applied to said second shoulder and the inner portion extending between the socket bore wall and the pipe section to said first shoulder and thence extending between and being clamped by the end of the pipe section and the first shoulder and a seal between the pipe section and the socket bore wall and extending outwardly from said seal-dam toward said one end of the socket member.

10. In a pipe joint, an annular socket member, a pipe section inserted in the bore of the pipe member, the outer peripheral face of the pipe section being spaced from the bore wall of the socket, a first transverse shoulder spaced from one end of the socket member and extending radially into the socket bore and into opposition with the inner end of the pipe section, a second transverse shoulder in the socket member bore but extending radially outward from said bore at a point between said first shoulder and said one end of the socket member, a seal-dam comprising a multiple-ply annulus, each ply embodying an annular body portion and a plurality of fingers extending inwardly from the body portion, the body portion of one of the plies being applied to said second shoulder, said fingers extending between the socket bore wall and the pipe section to said first shoulder and thence extending between and being clamped by the end of the pipe section and the first shoulder, and a seal between the pipe section and the socket bore wall and extending outwardly from said seal-dam toward said one end of the socket member.

11. In a coupling for pipes, an annular socket member, the bore wall of the member being annularly grooved to provide an annular, transverse shoulder offset from the bore of the member, a multiple-ply annulus of flexible material, each ply embodying an annular body portion and a plurality of fingers extending inwardly from the body portion, the body portions of the several plies being secured together and to said shoulder and the fingers of the plies extending radially into the bore of the socket member, the fingers of one ply being movable with respect to the fingers of another ply, and the fingers of one ply each overlapping portions of two adjacent fingers of the adjacent ply.

12. In a coupling for pipes, an annular socket member, the bore wall of the member being annularly grooved to provide an annular, transverse shoulder offset from the bore of the member and facing towards one end of the member, a multiple-ply annulus, each ply embodying an annular body portion and a plurality of fingers extending inwardly from the body portion, the body portions of the several plies being secured together and to said shoulder and the fingers of the plies extending radially into the bore of the socket member, the fingers of one ply being movable with respect to the fingers of another ply, and the fingers of one ply each overlapping portions of two adjacent fingers of the adjacent ply; the ply directly applied to said shoulder being of relatively thick, soft paper, and the ply nearest said one end of the member being of relatively tough, hard paper.

13. In a coupling for pipes, an annular socket member, the bore wall of the member being annularly grooved to provide an annular, transverse shoulder offset from the bore of the member and facing towards one end of the member, a multiple-ply annulus, each ply embodying an annular body portion and a plurality of fingers extending inwardly from the body portion, the body portions of the several plies being secured together and to said shoulder and the fingers of the plies extending radially into the bore of the socket member, the fingers of one ply being movable with respect to the fingers of another ply, and the fingers of one ply each overlapping portions of two adjacent fingers of the adjacent ply; the ply directly applied to said shoulder being of relatively thick, soft paper, and the ply nearest said one end of the member being waterproofed and relatively tough, hard paper.

14. In a coupling for pipes, an annular socket member, the bore wall of the member being annularly grooved to provide an annular, transverse shoulder offset from the bore of the member and facing towards one end of the member, a multiple-ply annulus, each ply embodying an annular body portion and a plurality of fingers extending inwardly from the body portion, the body portions of the several plies being secured together and to said shoulder and the fingers of the plies extending radially into the bore of the socket member, the fingers of one ply being movable with respect to the fingers of another ply, and the fingers of one ply each overlapping portions of two adjacent fingers of the adjacent ply; the ply directly applied to said shoulder being of relatively thick, soft paper, and the ply nearest said one end of the member being of relatively tough, hard paper, and a non-setting adhesive between the fingers of adjacent plies adapted yieldingly to resist relative movement between the fingers of one ply and the fingers of the adjacent ply.

15. In a pipe joint, an annular socket member, a pipe section inserted in the bore of the socket member, the outer peripheral face of the pipe section being spaced from the bore wall of the socket, a transverse annular shoulder in the socket member, said shoulder being spaced from one end of the socket member and extending radially outward from the socket member bore, a seal-dam comprising a multiple-ply annulus, each ply embodying an annular body portion and a plurality of fingers extending inwardly from the body portion, the body portion of one of the plies being applied to said shoulder, said fingers extending longitudinally along the pipe section between it and the socket bore wall, the fingers of one ply each overlapping portions of two adjacent fingers of the adjacent ply; and a seal between the pipe section and the socket bore wall and extending from said seal-dam toward said one end of the socket member.

16. A seal-dam for pipe joints, embodying a multiple-ply annulus, each ply embodying an annular body portion and a plurality of fingers extending inwardly from the body portion, said fingers being of flexible material and the fingers of one ply being movable with respect to the fingers of another ply, a non-setting adhesive between the fingers of one ply adapted yieldingly to resist relative movement between the fingers of that ply, and the fingers of one ply each overlapping portions of two adjacent fingers of the adjacent ply.

WILLIAM G. CALDER.